US006276750B1

(12) United States Patent
Frisch

(10) Patent No.: US 6,276,750 B1
(45) Date of Patent: Aug. 21, 2001

(54) FORK LIFT TRUCK CAB

(75) Inventor: Bert Frisch, Geesthacht (DE)

(73) Assignee: Still GmbH (DE)

( * ) Notice: Subject to any disclaimer, the term of this patent is extended or adjusted under 35 U.S.C. 154(b) by 0 days.

(21) Appl. No.: 09/276,323

(22) Filed: Mar. 25, 1999

(30) Foreign Application Priority Data

Apr. 3, 1998 (DE) .............................. 198 15 126

(51) Int. Cl.[7] .................................................. B60R 27/00
(52) U.S. Cl. .................................. 296/190.1; 296/190.1; 296/190.03; 296/19.08
(58) Field of Search ................. 296/190.01, 190.03, 296/190.08, 190.1, 78.1, 79, 190.04

(56) References Cited

U.S. PATENT DOCUMENTS

| 3,891,264 | * | 6/1975 | Hunter, II et al. | 296/190.04 |
|---|---|---|---|---|
| 3,944,097 | * | 3/1976 | Savage | 296/28 X |
| 4,018,473 | * | 4/1977 | Chalupsky | 296/190.04 |
| 4,119,340 | * | 10/1978 | Wolfe | 296/137 |
| 4,331,359 | * | 5/1982 | Sheldon | 296/146 |
| 4,392,669 | * | 7/1983 | Martin, Jr. | 296/190 X |
| 4,412,595 | * | 11/1983 | Kinzel | 296/190 X |
| 4,427,090 | * | 1/1984 | Fredriksen et al. | 296/190.04 X |
| 4,605,259 | * | 8/1986 | Hulburt | 296/190 |
| 4,675,933 | * | 6/1987 | Martin, Jr. | 296/190 X |
| 4,679,847 | * | 7/1987 | Dirck | 296/190 X |
| 4,702,516 | * | 10/1987 | Martin, Jr. | 296/190 |
| 4,973,082 | * | 11/1990 | Kincheloe | 280/756 |
| 4,995,469 | * | 2/1991 | Mikkelsen et al. | 296/190.04 X |
| 5,096,253 | * | 3/1992 | Jo et al. | 296/190 |
| 5,286,081 | * | 2/1994 | Martin, Jr. | 296/190 |
| 5,496,643 | * | 3/1996 | Von Alpen | 428/432 |
| 5,577,795 | * | 11/1996 | Shinsen | 296/190 |
| 5,673,963 | * | 10/1997 | Pietzch | 296/190 |
| 5,685,388 | * | 11/1997 | Bothwell et al. | 180/219 |
| 5,906,411 | * | 5/1999 | Stauffer et al. | 296/190.1 X |

FOREIGN PATENT DOCUMENTS

| 2649-064 | * | 1/1991 | (FR) | 296/78.1 |
|---|---|---|---|---|
| 2 241 477 | * | 9/1991 | (GB) | 296/78.1 |

OTHER PUBLICATIONS

J.Y. (author), "Light scooter with weather protection", Global Viewpoints, Automotive Engineering, p. 69, Dec. 1994.*
Article entitled: "Ergonomie: Priorität bei der Staplerentwicklung"; F + H Fördern und Heben 40(1990) Nr. 12. (Dec. 1990).

* cited by examiner

Primary Examiner—D. Glenn Dayoan
Assistant Examiner—Lori L. Coletta
(74) Attorney, Agent, or Firm—Webb Ziesenheim Logsdon Orkin & Hanson, P.C.

(57) ABSTRACT

An industrial truck cab is provided having a roof made at least partly of bulletproof glass. This roof combines a high degree of safety against falling objects with good sight lines.

5 Claims, 1 Drawing Sheet

FORK LIFT TRUCK CAB

The present application claims foreign priority to German application Ser. No. 198 15 126.8 filed Apr. 3, 1998.

BACKGROUND OF THE INVENTION

1. Field of the Invention

This invention relates generally to a cab of an industrial truck and, more particularly, to the cab of a fork lift truck.

2. Description of the Currently Available Technology

Industrial trucks with a driver workplace generally have a cab or roof that protects the driver from falling objects or falling parts of the load. In the prior art, the roof has been constructed both as a metal grid structure and also from sheet metal with an integrated window. These types of roofs represent a compromise between driver protection and a clear driver's view forward or diagonally upward.

It is therefore an object of the invention to provide a cab for an industrial truck that combines a high degree of safety with an improved field of vision for the driver.

SUMMARY OF THE INVENTION

The invention teaches that this object can be accomplished by a cab for an industrial truck having a roof made at least partly with substantially transparent bulletproof glass. The invention teaches that the roof is preferably substantially transparent for an improved field of vision and simultaneously provides the driver with optimal protection against falling objects. The bulletproof glass of the invention can be provided only in the roof area or, in a preferred embodiment, can also form a windshield and/or a rear window of the cab. For example, two or three separate bulletproof glass panels can be provided which protect the driver from the front, from the rear and overhead, which thereby allow the driver a good view in those directions. It is also possible that the glass panels can be constructed as one piece and can form the windshield and the roof, for example of the cab. In another embodiment, the one-piece glass panel runs continuously from the windshield, over the roof and to the rear window. The driver's field of vision is optimal in this embodiment. Only encircling metal frames that hold the glass panel and that form the frame for the doors or the side windows of the cab thus remain in the driver's field of vision.

In one preferred embodiment, the cab can be eggshaped or spherical. A spherical shape, for example, is inherently one of the most stable shapes possible, as is known from the use of this shape in conventional reactor vessels. The use of an egg-shaped cab makes it possible to have relatively thin walls while providing a high degree of safety and stability inherent in such an egg shape.

The driver's field of vision can be further improved if the side pieces that form the doors or the windows of the cab are also made of a transparent material, such as glass, e.g., bulletproof glass, or plastic. In this case, the driver has a clear view practically all the way around the cab.

Additional advantages, features and configurations of the invention are described in greater detail below, with reference to the exemplary embodiment illustrated in the accompanying drawing.

BRIEF DESCRIPTION OF THE DRAWING

The drawing FIGURE is a perspective view of an industrial truck having a cab of the invention.

DESCRIPTION OF THE PREFERRED EMBODIMENTS

Figure 1:
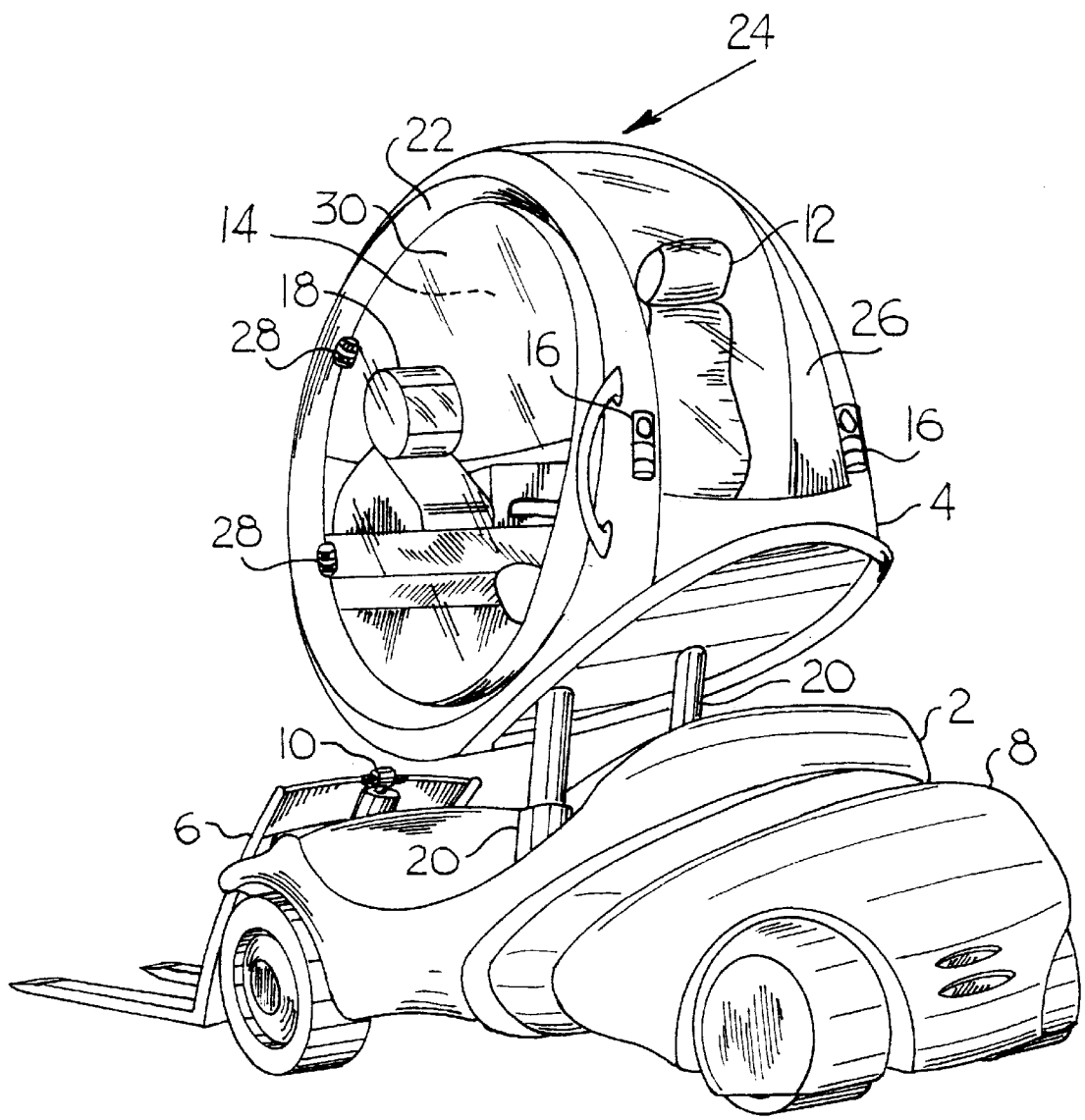

As used herein, the term "bulletproof glass" is used in the conventional sense to refer to tempered or strengthened glass capable of withstanding the impact of a bullet or similar force. The thickness of the glass used in the invention may differ from one country to another depending upon the occupational safety requirements for industrial trucks in each country, e.g., how much weight an industrial truck roof must withstand, the particular work environment in which the truck will operate, etc.

The FIGURE shows one embodiment of a fork lift truck of the invention having a frame 2, a cab 4, a lifting frame 6 and a counterweight 8. In this embodiment, the lifting frame 6 is equipped with a telescoping cylinder 10 to raise and/or lower a load. Inside the cab 4 there is a driver's seat 12 which, as is common in modern fork lift trucks, has a small steering wheel on the left armrest and a joystick for the fork lift functions as well as a selector for the direction of travel on the right armrest. In this embodiment, the cab 4 has a windshield 14 and two cameras 16, e.g., conventional video cameras. The cameras 16 are directed toward the rear of the industrial truck. The cameras 16 are in electronic communication with a screen 18 located in front of the driver, i.e., between the driver's seat 12 and the lifting frame 6. The screen 18 may be any type of conventional screen, e.g., a conventional video monitor, LCD display, "head's up display", etc., to project for the driver an image on the screen 18 of what is behind the industrial truck. The screen 18 can be integrated into the windshield 14 in the area behind the fork lift on the lifting frame 6. In this embodiment, the cab 4 can be elevated from the frame 2 by two elevating cylinders 20, e.g., conventional pneumatic or hydraulic cylinders.

As shown in the FIGURE, the driver's seat 12 is enclosed by a substantially egg-shaped cab 4. In this embodiment, the windshield 14 extends over the driver's seat 12 to form the roof 24 of the cab 4 and also extends behind the driver's seat 12 to thus also form the rear window 26 of the cab 4. The driver therefore has an unimpeded view toward the front, overhead and toward the rear. In this embodiment, the sides of the cab 4 may be open. Alternatively, the sides of the cab 4 can be closed with doors 22 in the form of transparent side pieces 30 movably, e.g., attached by hinges 28, to the cab 4. Thus, the driver has an extraordinarily good view of his surroundings, which is restricted only by the curved metal frames that enclose the bulletproof glass panel forming the windshield 14, roof 24 and rear window 26.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A cab for an industrial truck, the cab comprising a roof made at least partly of bulletproof glass and at least one of a windshield and a rear window also made of bulletproof glass, wherein the roof, the windshield and the rear window are defined by a single continuous piece of bulletproof glass.

2. The cab as claimed in claim 1, wherein the cab has an ovoid or spherical shape in cross-section.

3. The cab as claimed in claim 1, including side pieces made of a transparent material.

4. The cab as claimed in claim 3, wherein the transparent material is selected from the group consisting of glass and plastic.

5. A cab of an industrial truck having a frame and a lifting frame, the cab comprising:

a roof, a windshield and a rear window, each made at least partly of bulletproof glass; and side pieces made at least partly of transparent material, wherein the roof, the windshield and the rear window are defined by a single, continuous piece of bulletproof glass.

* * * * *